(12) United States Patent
Washington

(10) Patent No.: US 11,820,589 B1
(45) Date of Patent: Nov. 21, 2023

(54) CONTAINERS FOR CARRYING TRASH BAGS AND JANITORIAL USES

(71) Applicant: Damon L. Washington, Dallas, TX (US)

(72) Inventor: Damon L. Washington, Dallas, TX (US)

( * ) Notice: Subject to any disclaimer, the term of this patent is extended or adjusted under 35 U.S.C. 154(b) by 329 days.

(21) Appl. No.: 17/373,231

(22) Filed: Jul. 12, 2021

Related U.S. Application Data

(60) Provisional application No. 63/058,656, filed on Jul. 30, 2020.

(51) Int. Cl.
*B65F 1/06* (2006.01)
*B62B 3/10* (2006.01)

(52) U.S. Cl.
CPC ............... *B65F 1/06* (2013.01); *B62B 3/106* (2013.01); *B62B 2202/50* (2013.01); *B65F 2210/18* (2013.01)

(58) Field of Classification Search
None
See application file for complete search history.

(56) References Cited

U.S. PATENT DOCUMENTS

| | | | |
|---|---|---|---|
| 5,160,001 A * | 11/1992 | Marceau | ............... G06F 1/1628 190/902 |
| 5,226,576 A | 7/1993 | Ellsworth | |
| 5,240,176 A | 8/1993 | Akers | |
| 7,699,211 B2 | 4/2010 | Holloway | |
| 2005/0000976 A1 | 1/2005 | Keberlein | |
| 2005/0115511 A1 | 6/2005 | Lange | |
| 2011/0114688 A1 * | 5/2011 | Peng | ........................ A45F 5/021 224/600 |
| 2012/0073714 A1 * | 3/2012 | Hai | ........................ A45C 13/185 150/101 |
| 2013/0146636 A1 | 6/2013 | Romero | |
| 2015/0208790 A1 * | 7/2015 | Pylkovas | ............... A45C 13/30 224/578 |
| 2016/0095404 A1 * | 4/2016 | Zech | ..................... A45C 13/002 248/95 |
| 2019/0059538 A1 * | 2/2019 | Osnowitz | ............ B65D 33/1658 |

FOREIGN PATENT DOCUMENTS

| | | | |
|---|---|---|---|
| CA | 111038862 A | | 4/2020 |
| CN | 218921972 U | * | 4/2023 |
| GB | 2287872 A | | 10/1995 |

* cited by examiner

*Primary Examiner* — Steven M Marsh
(74) *Attorney, Agent, or Firm* — Fresh IP PLC; John R. Bednarz

(57) ABSTRACT

The disclosure provides a container for carrying trash bags. The container includes a first compartment in a rectangular prism having a top wall and a first side wall operable to open and close for access to the first compartment. The container also includes a second compartment in a triangular prism and secured to the first compartment. The second compartment includes first and second side walls connected to the top wall of the first compartment on bottom edges of the first and second side walls and an opening operable for access to the second compartment. The container may also include a first strap coupled to a second portion of a buckle clip and a second strap coupled to a second portion of the buckle clip and operable to secure to the first portion of the buckle clip. The first and second straps and the buckle clip are operable to attach the container to a janitorial cart.

9 Claims, 11 Drawing Sheets

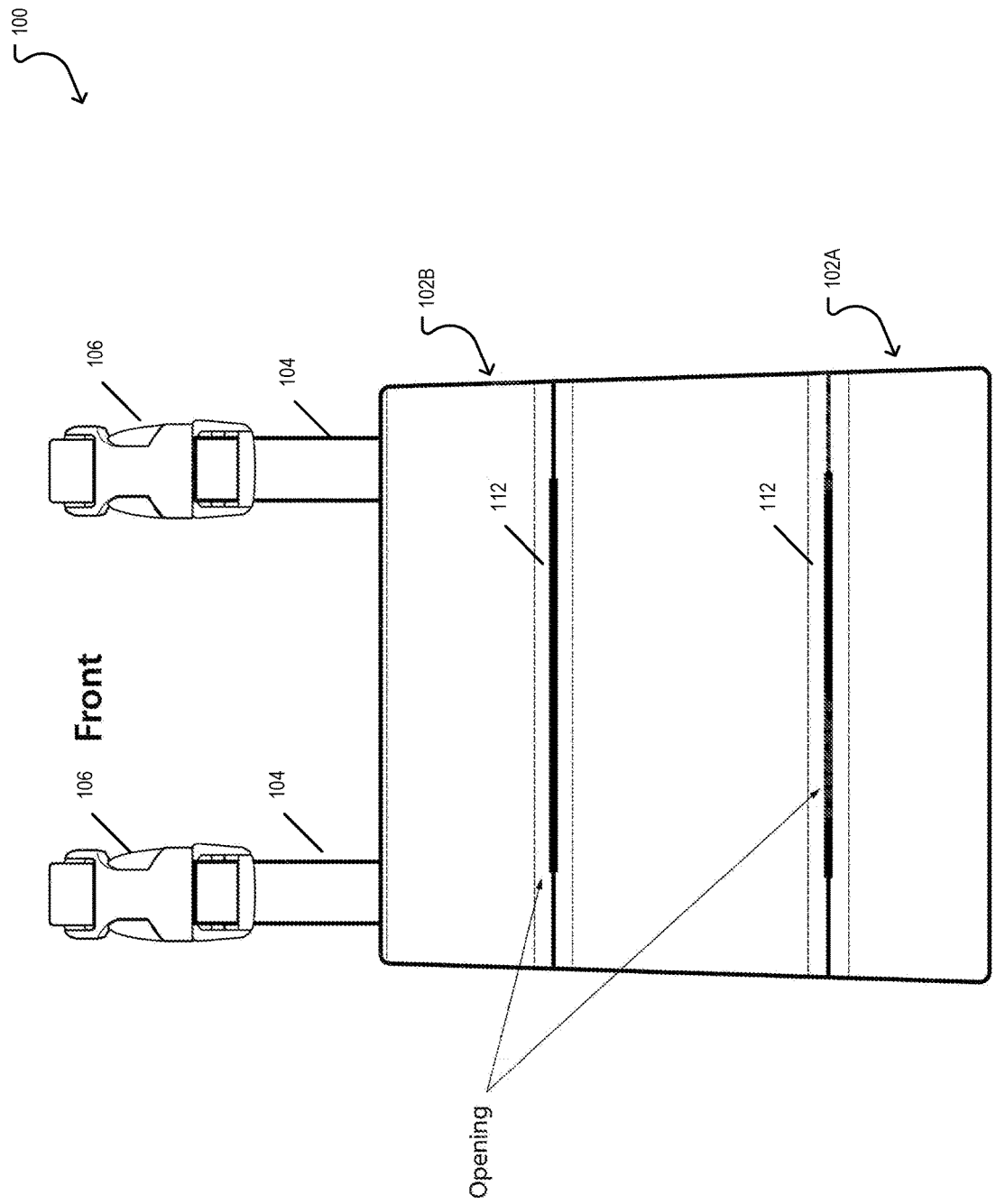

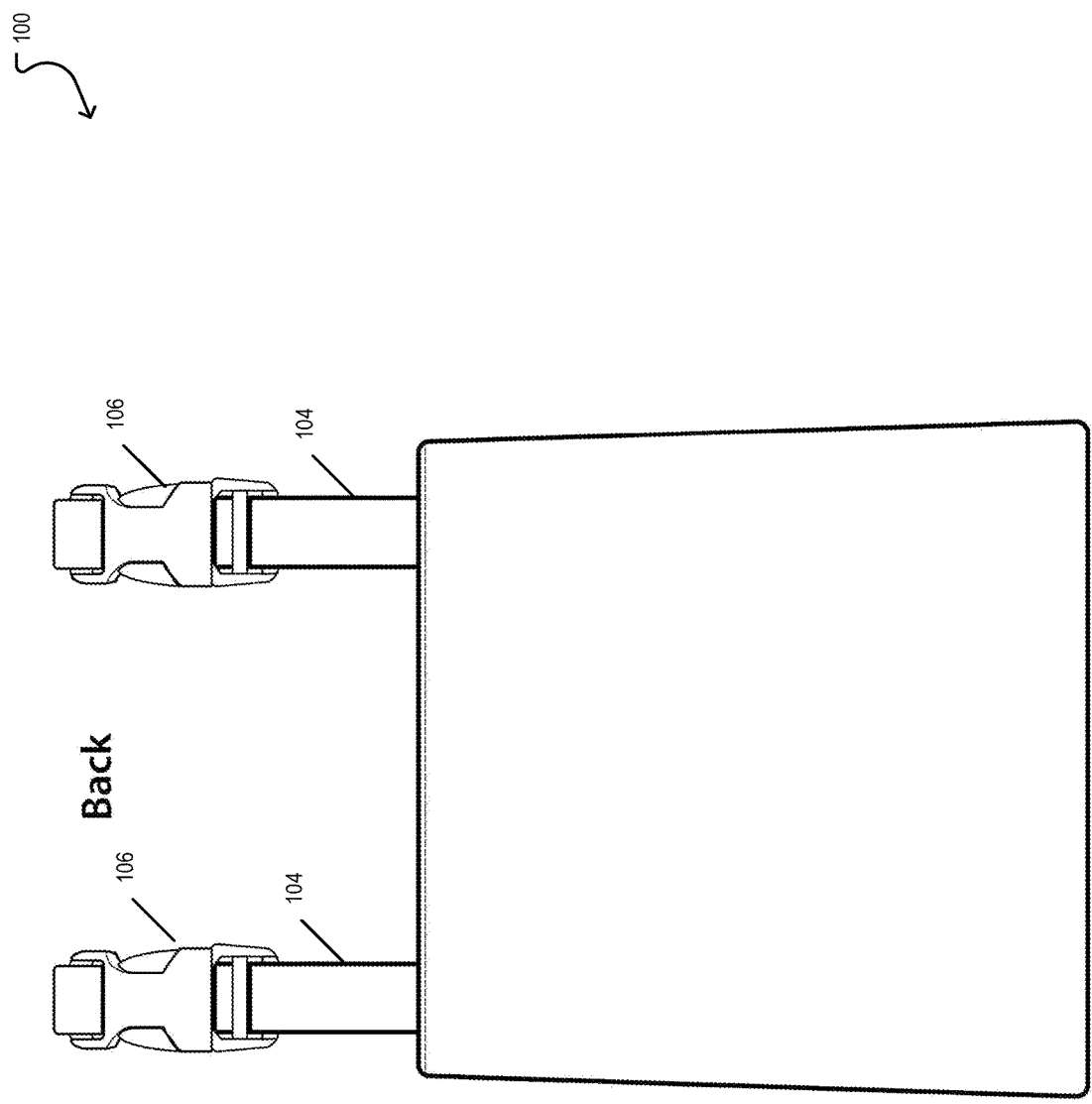

CONTAINERS FOR CARRYING TRASH BAGS AND JANITORIAL USES

CROSS-REFERENCE TO RELATED APPLICATION

This application claims the benefit of U.S. Provisional Application No. 63/058,656, filed Jul. 30, 2020, which is hereby incorporated by reference in its entirety.

FIELD

The disclosure is directed to containers for carrying trash bags and janitorial uses.

BACKGROUND

There is a demand for containers for carrying trash bags and allowing for access of trash bags in the janitorial industry.

BRIEF SUMMARY

The disclosure provides a container for carrying trash bags. The container includes a first compartment in a rectangular prism having a top wall and a first side wall operable to open and close for access to the first compartment. The container also includes a second compartment in a triangular prism and secured to the first compartment. The second compartment includes first and second side walls connected to the top wall of the first compartment on bottom edges of the first and second side walls and an opening operable for access to the second compartment. The container may also include a first strap coupled to a second portion of a buckle clip and a second strap coupled to a second portion of the buckle clip and operable to secure to the first portion of the buckle clip. The first and second straps and the buckle clip are operable to attach the container to a janitorial cart.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein:

FIG. 14 illustrates a front view of the T-bag; and

FIG. 15 illustrates a back view of the T-bag.

DETAILED DESCRIPTION

Figure 1:
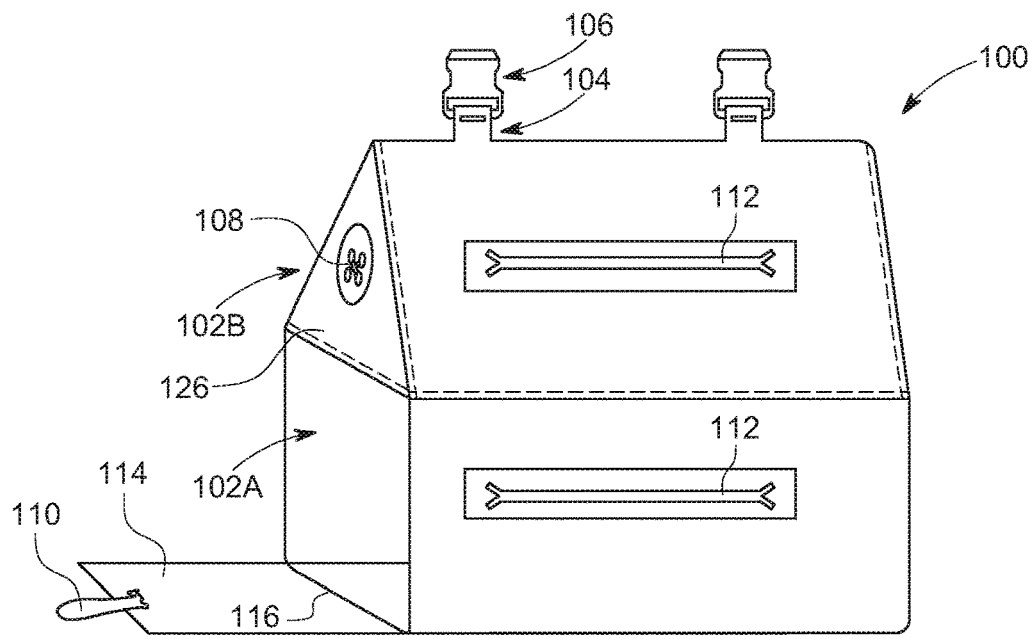
FIG. 1 illustrates a front perspective view of a container or T-bag for carrying trash bags in accordance with a first embodiment of the disclosure.
Figure 2:
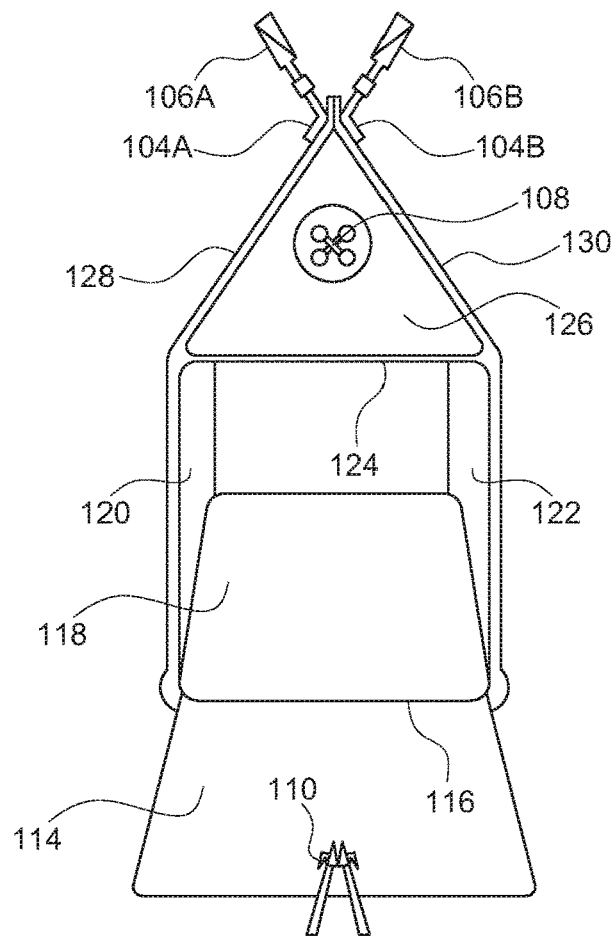
FIG. 2 illustrates a side perspective view of the T-bag of FIG. 1.

The disclosure may be understood by reference to the following detailed description, taken in conjunction with the drawings as described below. It is noted that, for purposes of illustrative clarity, certain elements in various drawings may not be drawn to scale.

The disclosure provides design of a container or apparatus for carrying trash bags. The container allows for janitorial uses. The container, also referred to a T-bag, includes a first compartment or a first pocket and a second compartment or second pocket, and allows more efficient and quicker access of trash bags, or rolls of trash bags in the first compartment, and also dispenses trash bags with ease from the second compartment. The T-bag also includes straps with buckle clips, which are designed to strap to a trash can or a janitorial cart. As such, the T-bag can help improve work efficiency for users, such as janitors, among others. Alternatively, the apparatus may include a single pocket or compartment rather than the first compartment or pocket and the second compartment or pocket.

FIGS. 1-6 illustrate various views of the T-bag in accordance with one embodiment. Turning to the front perspective view of FIG. 1 now, a container or a T-bag 100 may include a first compartment 102A in a rectangular prism shape and a second compartment 102B in a triangular prism shape. The first and second compartments can store trash bags or rolls of trash bags 112 and thus allow a user to carry rolls of trash bags 112. The first compartment 102A is on a bottom of the second compartment 102B. The first and second compartments share a common wall 124, which is a top wall of the first compartment 102A, and is also a bottom wall of the second compartment 102B.

The rectangular prism is in a 3D shape, and includes six surfaces, a bottom surface, a top surface, and four side surfaces. One of the side surfaces is operable to open and close for more efficient and quicker access to the trash bags or trash bag rolls inside the first compartment. The first compartment 102A may also include a bottom wall 118 opposite to the common wall 124, two opposite side walls 120 and 122 between the common wall 124 and the bottom wall 118.

The first compartment 102A may include a side wall 114 operable to pivot against edge 116 of the bottom wall 118 of the first compartment to open and close, which allows more efficient and quicker access for the rolls of trash bags 112 inside the first compartment. The side wall 114 is in a rectangular shape and may include a loop 110.

The triangular prism is also in a three-dimensional (3D) shape, and includes five surfaces, a bottom surface, and four side surfaces. Two of the side surfaces are partially joined together on the top and create an opening for more efficient and quicker access to the trash bags or trash bag rolls inside the second compartment. The second compartment includes a side wall 126 in a triangular shape which may include a button or attachment device 108. The loop 110 is operable to secure to the button 108.

The T-bag 100 may include one or two straps 104 with buckle clips 106 on a top edge of the second compartment. Turning to the side perspective view of FIG. 2 now, the straps 104A and 104B may be secured to two opposite side walls 128 and 130. One strap 104A is coupled to a first portion 106A of a buckle clip 106. Another strap 104B is coupled to a first portion 106B of the buckle clip 106.

Figure 3:
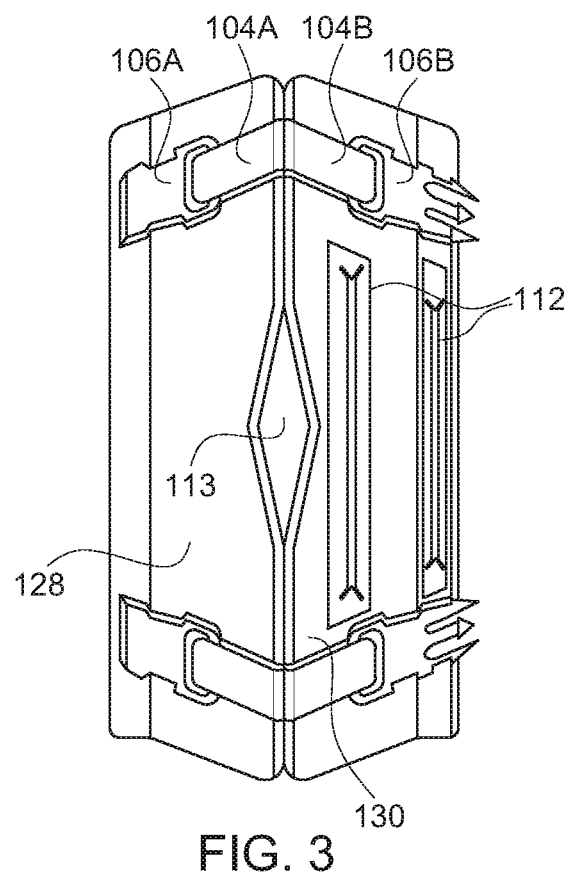
FIG. 3 illustrates a top perspective view of the T-bag of FIG. 1.

Turning to the top perspective view of FIG. 3 now, the second compartment 102B includes an opening 113 between the two opposite side walls for more efficient and quicker access to the trash bags or trash bag rolls inside the second compartment.

Figure 4:
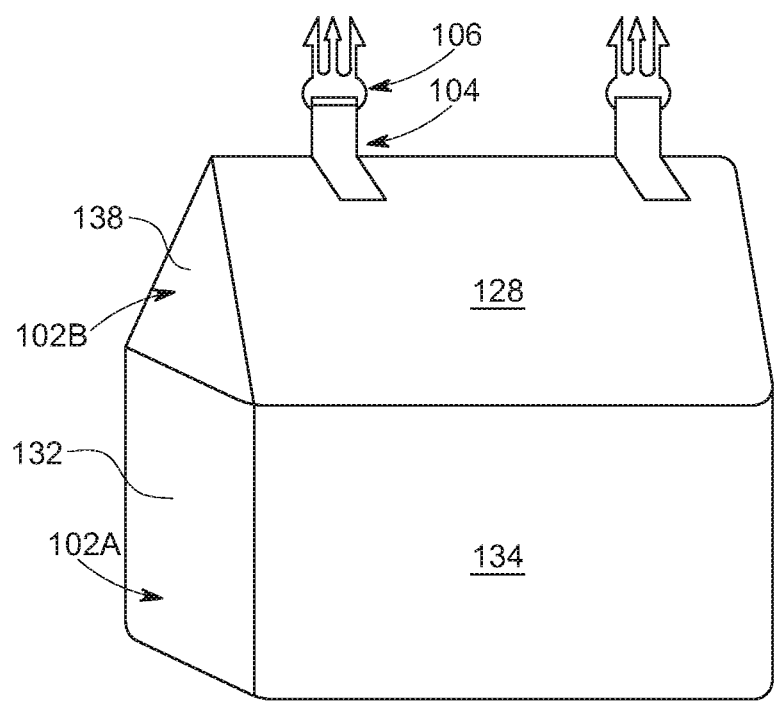
FIG. 4 illustrates a back perspective view of the T-bag of FIG. 1.

Turning to the back perspective view of FIG. 4 now, the second compartment 102B includes a side wall 138 in a triangular shape, which is joined to a side wall 132 of the first compartment 102A. The side wall 132 is in a rectangular shape. The second compartment 102B also includes a side wall 128 in a rectangular shape, which is joined to a side wall 134 of the first compartment 102A. The side wall 134 is also in a rectangular shape.

Figure 5:
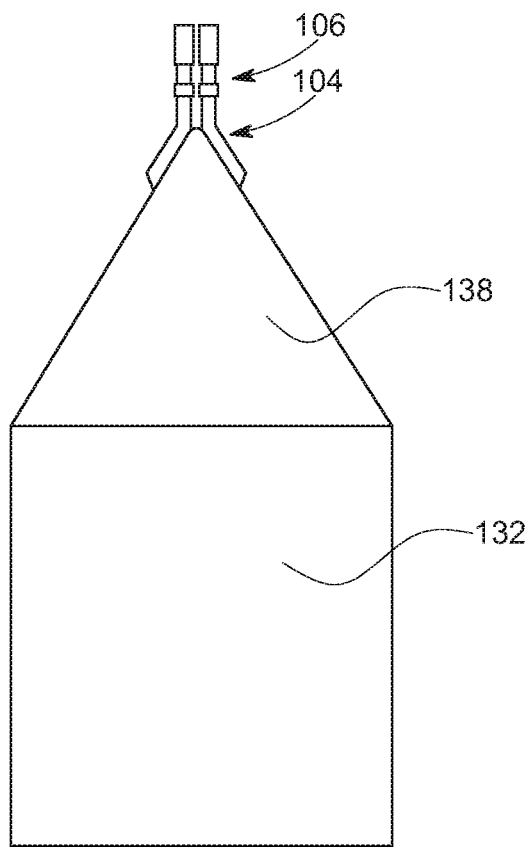
FIG. 5 illustrates a bottom view of the T-bag of FIG. 1.
Figure 6:
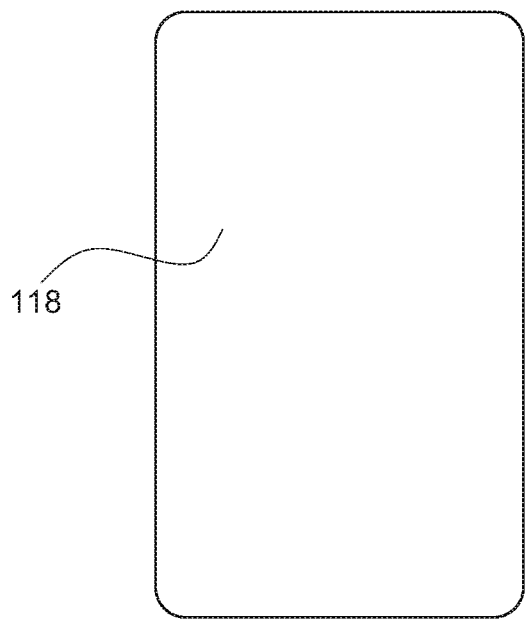
FIG. 6 illustrates a side view of the T-bag of FIG. 1.
Figure 7:
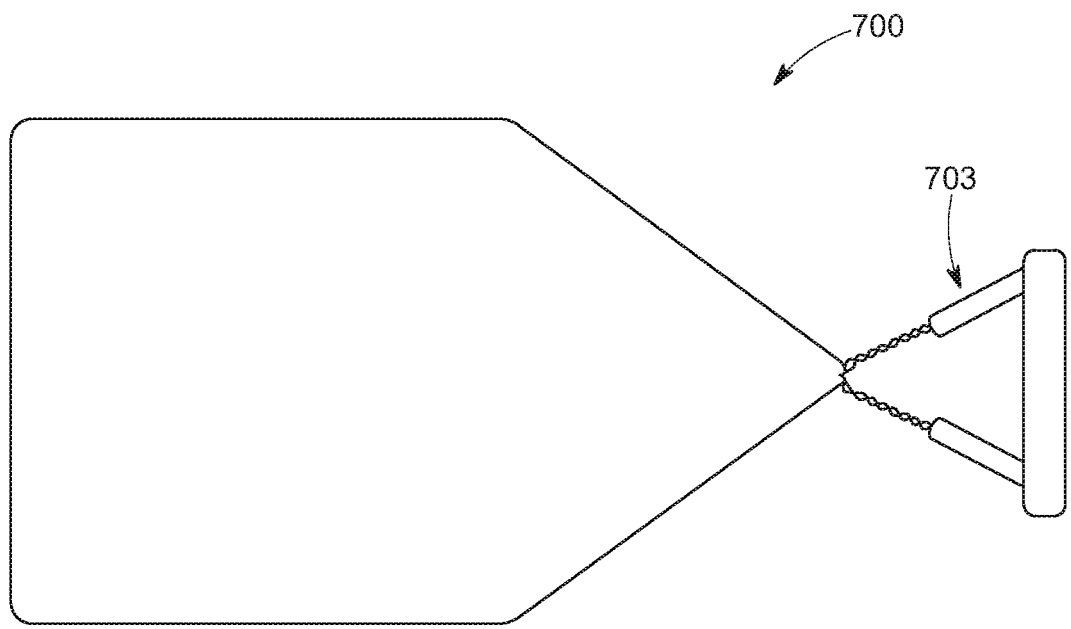
FIG. 7 illustrates a first side view of a container or T-bag for carrying trash bags in accordance with another embodiment of the disclosure.

Turning to the side view of FIG. 5 and the bottom view of FIG. 6 now, the bottom wall 118 is in a rectangular shape. The side wall 132 of the first compartment 102 is secured to the side wall 138 of the second compartment 102B. In addition, as shown in FIG. 5, the straps 104 with buckle clips 106 are shown attached to the top edge of the second compartment.

FIGS. 7-12 illustrate another embodiment of the T-bag. Turning to a first side view shown in FIG. 7 now, straps with buckle clips 703 are sticking out from the top of the T-bag 700. The T-bag has a top compartment 714 in a triangle prism and a bottom compartment 710 in a rectangular prism.

Figure 8:
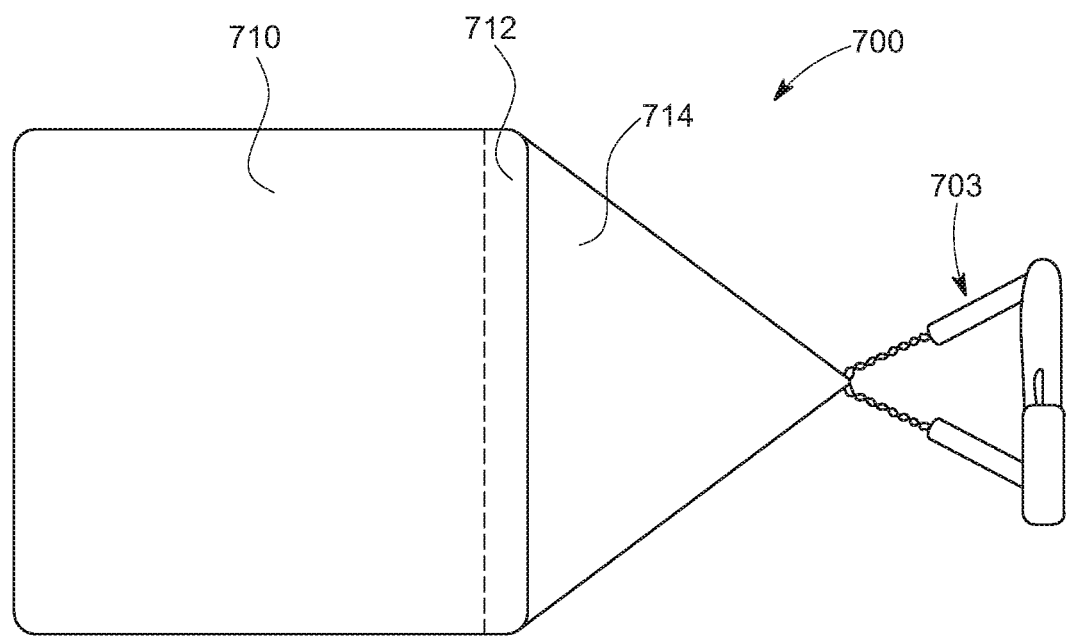
FIG. 8 illustrates a second side view of the T-bag of FIG. 7.

Turning to a second side view shown in FIG. 8 now, similar to the first side view, the straps with buckle clips 703 are sticking out from the top. Also, the T-bag 700 includes a peel back opening 712 operable to be inserted rolls of trash bags into the bottom compartment 710.

Figure 9:
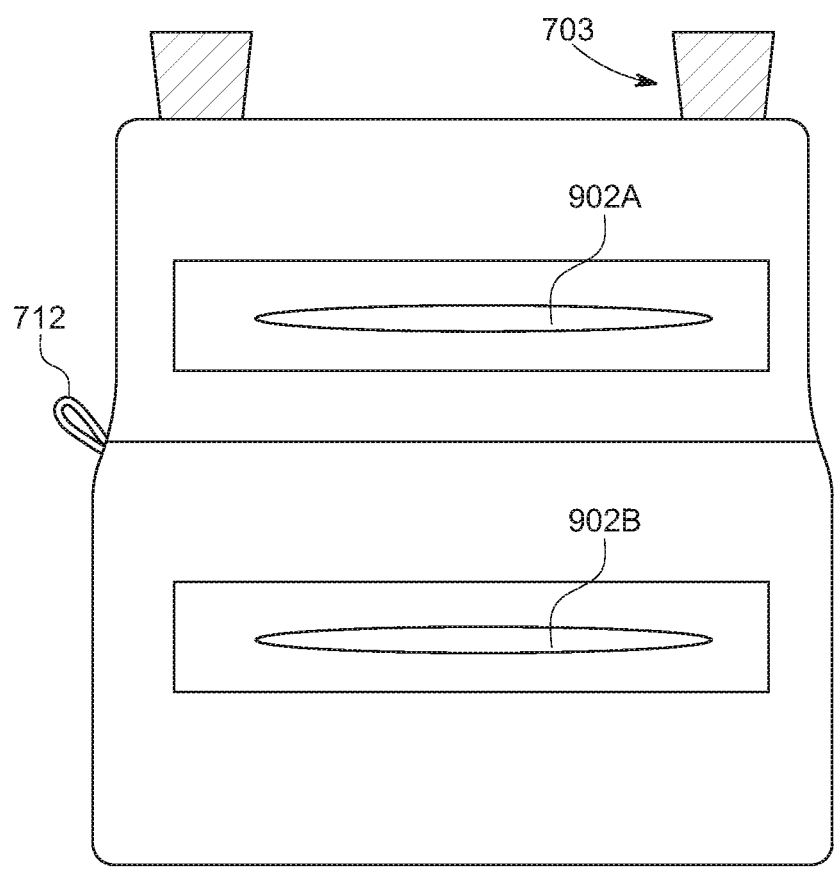
FIG. 9 illustrates a front view of the T-bag of FIG. 7.

Turning to a front view shown in FIG. 9 now, the T-bag 700 includes two dispense pockets 902A and 902B to dispense trash bags. The T-bag also includes two straps with buckle clips coming from the top.

Figure 10:
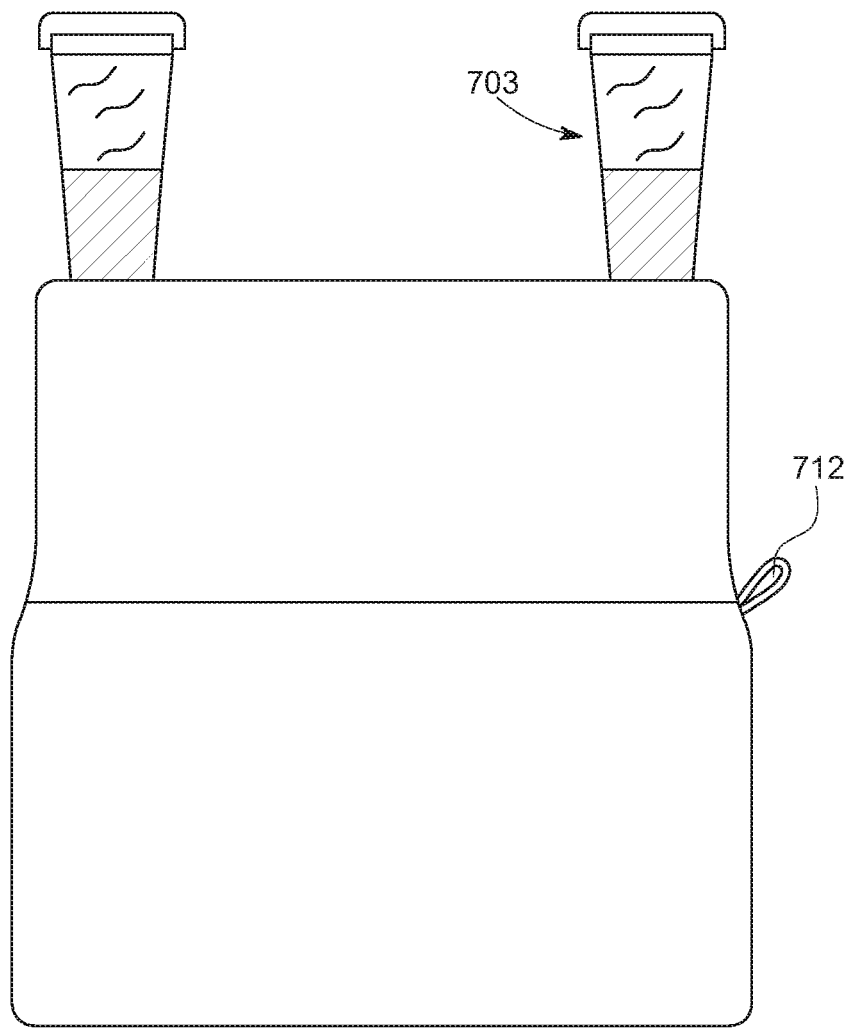
FIG. 10 illustrates a back view of the T-bag of FIG. 7.

Turning to a back view shown in FIG. 10 now, the T-bag 700 includes two straps with buckle clips 703 on the top of the T-bag.

Figure 11:
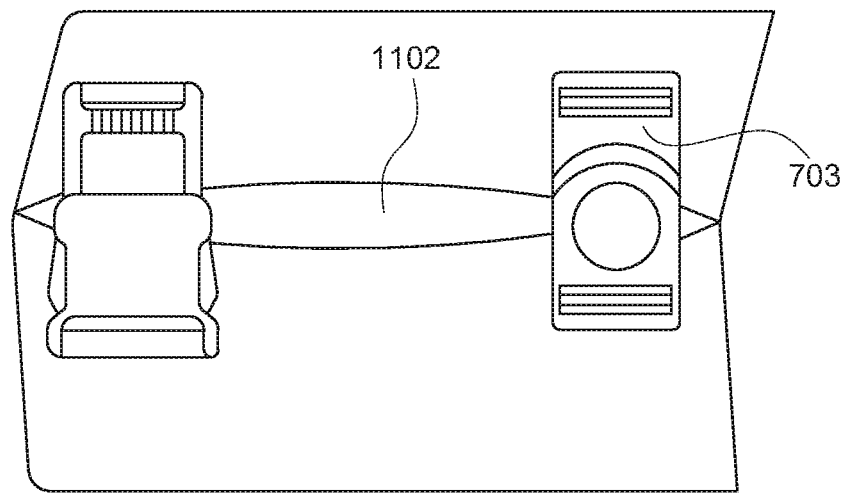
FIG. 11 illustrates a top view of the T-bag of FIG. 7.

As shown in the top view of FIG. 11 now, the T-bag 700 includes a pocket or a compartment 1102 for rolls of the trash bags to be inserted. The T-bag also includes two straps with buckle clips.

Figure 12:
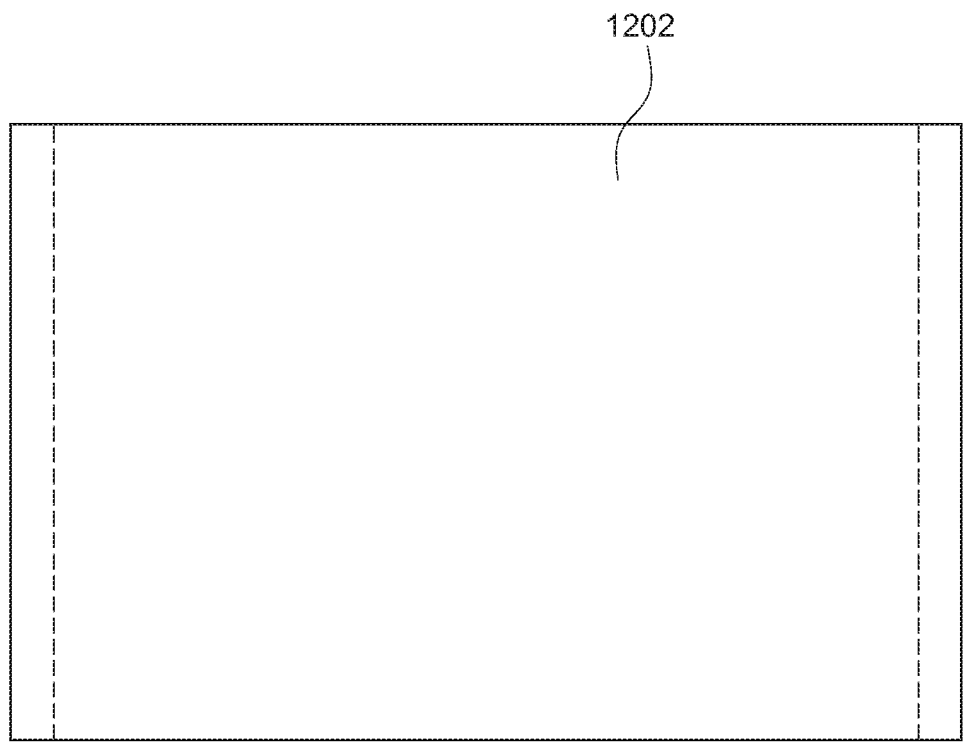
FIG. 12 illustrates a bottom view of the T-bag of FIG. 7.

As shown in the bottom view of FIG. 12 now, a bottom wall 1202 of the T-bag 700 is in a rectangle shape.

In some embodiments, the first and second compartments may be made from clothes or woven fabrics wrapped around a cardboard, which provides the shape of the container. The clothes or woven fabrics can be sewed to form the container or T-bag.

In a further example, the apparatus or T-bag 100 may include a first compartment 102A configured to receive a first roll of plastic bags having a first size through a first opening on a top of the first compartment 102A, the first compartment having a second opening allowing access to the first roll of plastic bags, the first compartment located above a divider. In addition, the T-bag 100 may include a second compartment 102B configured to receive a second roll of plastic bags through a first opening on a side of the second compartment 102B, the second compartment having a second opening allowing access to the second roll of plastic bags, the second compartment located below the divider that separates the first compartment from the second compartment. Additionally, the apparatus 100 may include a first buckle attachment device having a first buckle 106 to attach to the apparatus and a second buckle attachment device having a second buckle 106 to attach to the apparatus. Additionally, the apparatus may have a fabric housing that houses the first compartment 102A and the second compartment 102B, the first buckle attachment device attached to a top left region of the fabric housing and the second buckle attachment device attached to a top right region of the fabric housing, the first compartment located below the first buckle attachment device and the second buckle attachment device and the second compartment located below the first compartment.

Figure 13:
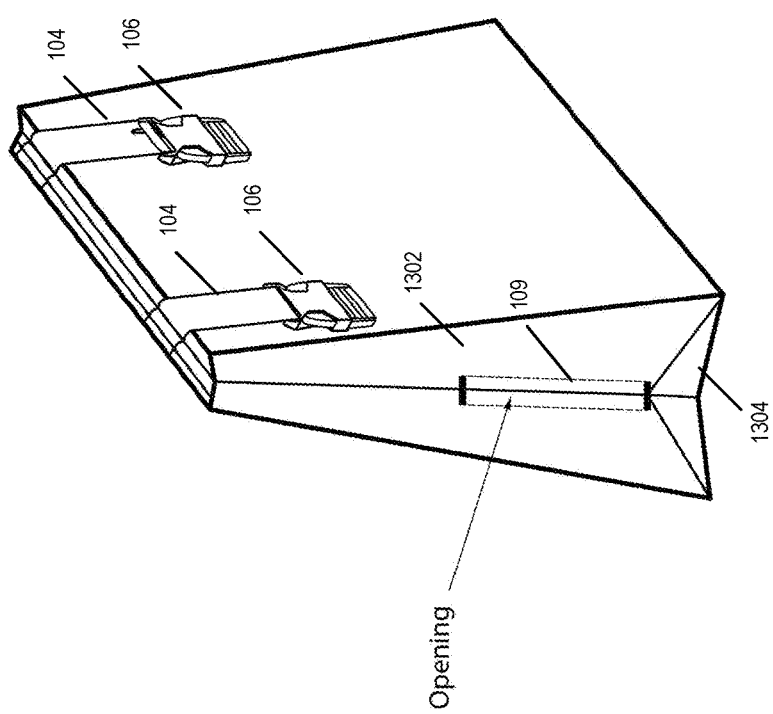
FIG. 13 illustrates another side perspective view of a container or T-bag for carrying trash bags in accordance with another embodiment of the disclosure.

In another example, as shown in FIGS. 13-15, the apparatus 100 may have a first pocket 102A configured to receive a first roll of plastic bags having a first size through a first opening 109 on a side of the first pocket, the first pocket having a second opening 112 allowing access to the first roll of plastic bags, the first pocket located above a divider and a second pocket 102B configured to receive a second roll of plastic bags through a first opening 109 on a side of the second pocket, the second pocket having a second opening 112 allowing access to the second roll of plastic bags, the second pocket located below the divider that separates the first pocket from the second pocket. The side of the apparatus 100 may have two upper walls 1302 that are concave or are shaped such that they meet toward the interior of the apparatus and connect in an upper portion of the side and two lower walls 1304 that are also concave or are shaped such that they meet toward the interior of the apparatus and connect in a lower portion of the side. The first opening 109 is in a center of the two upper walls 1302 and in a center and directly above the two lower walls 1304. In addition, the two upper walls 1302 and the two lower walls 1304 may meet at a point that may be part of the opening 109.

In addition, the apparatus may include a first buckle attachment device having a first buckle 106 configured to attach to a first handle of a thirty-gallon trash can or another object and a second buckle attachment device having a second buckle 106 configured to attach a second handle of the thirty gallon trash can or another object. In addition, the apparatus may have a fabric housing that houses or contains the first pocket and the second pocket. The first buckle attachment device may be attached to a top-left region of the fabric housing and the second buckle attachment device may be attached to a top-right region of the fabric housing. In addition, the first pocket may be located below the first buckle attachment device and the second buckle attachment device and the second pocket may be located below the first pocket.

In an example, the first buckle attachment device may include a first fabric belt 104 having the first buckle. The first buckle attachment device may be configured to be attached to the first handle of the thirty-gallon trash can. The second buckle attachment device may be a second fabric belt 104 having the second buckle. The second buckle attachment device may be configured to be attached to the second handle of the thirty-gallon trash can.

In another example, the fabric housing may be configured to hang from the first buckle attachment device and the second buckle attachment device. The fabric housing may hang at a particular height based on an adjustable length of the first fabric belt 104 and an adjustable length of the second fabric belt 104. The first pocket may be located above the second pocket on the fabric housing. Alternatively, the first pocket may be located below the second pocket on the fabric housing. The first opening on the side of the first pocket and the first opening on the side of the second pocket may together form an opening that is opened and closed with a zipper or another device 110.

As an example, the first pocket may have a triangular prism shape and the second pocket may have a rectangular prism shape. Other shapes are possible.

In another example, the first pocket may be configured to receive the first roll of plastic bags having the first size through a third opening on a side of the first pocket opposite the first opening and the second pocket may be configured to receive the second roll of plastic bags having the second size through a third opening on a side of the first pocket opposite the first opening. A plastic bag from the first roll of plastic bags may feed through the second opening 112 of the first pocket 102A and a plastic bag from the second roll of plastic bags may feed through the second opening 112 of the second pocket 102B. According to an example, the fabric housing may be machine washable fabric.

In another example, the apparatus 100 may have a pocket 102A configured to receive a roll of plastic bags through a first opening on a side of the first pocket 109. The first pocket may have a second opening 112 allowing access to the roll of plastic bags. In addition, the apparatus may have a first buckle attachment device having a first buckle 106 configured to attach to a first handle of a thirty-gallon trash can and a second buckle attachment device having a second buckle 106 configured to attach a second handle of the thirty gallon trash can. The apparatus also may have a fabric housing that houses the first pocket. The first buckle attachment device may be attached to a top-left region of the fabric housing and the second buckle attachment device may be attached to a top-right region of the fabric housing. The pocket 102A may be located below the first buckle attachment device and the second buckle attachment device. The first opening may be opened and closed using a zipper or another device 110.

The disclosure provides a container for carrying trash bags. The container includes a first compartment in a rectangular prism having a top wall and a first side wall operable to open and close for access to the first compartment. The container also includes a second compartment in a triangular prism and secured to the first compartment. The second compartment includes first and second side walls connected to the top wall of the first compartment on bottom edges of the first and second side walls and an opening operable for access to the second compartment. The container may also include a first strap coupled to a second portion of a buckle clip and a second strap coupled to a second portion of the buckle clip and operable to secure to the first portion of the buckle clip. The first and second straps and the buckle clip are operable to attach the container to a janitorial cart.

In some embodiments, the first side wall of the first compartment is perpendicular to the top wall.

In some embodiments, the first and second side walls of the second compartment are partially joined on top edges of the first and second side walls to create the opening.

In some embodiments, a button is attached on a third side wall of the second compartment.

In some embodiments, the first side wall of the first compartment comprises a loop operable to secure to the button.

In some embodiments, the first and second side walls of the second compartment are connected to the top wall of the first compartment.

In some embodiments, the first and second straps are secured to the first and second side walls of the second compartment.

In some embodiments, the first and second compartments comprise clothes or woven fabrics wrapped around a cardboard.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. An apparatus, comprising:
   a first pocket configured to receive a first roll of plastic bags having a first size through a first opening on a side of the first pocket, the first pocket having a second opening allowing access to the first roll of plastic bags, the first pocket located above a divider;
   a second pocket configured to receive a second roll of plastic bags having a second size through a first opening on a side of the second pocket, the second pocket having a second opening allowing access to the second roll of plastic bags, the second pocket located below the divider that separates the first pocket from the second pocket;
   a first buckle attachment device having a first buckle configured to attach to a first handle of a thirty-gallon trash can;
   a second buckle attachment device having a second buckle configured to attach a second handle of the thirty gallon trash can; and
   a fabric housing that houses the first pocket and the second pocket, the first buckle attachment device attached to a top-left region of the fabric housing and the second buckle attachment device attached to a top-right region of the fabric housing, the first pocket located below the first buckle attachment device and the second buckle attachment device and the second pocket located below the first pocket.

2. The apparatus of claim 1, wherein the first buckle attachment device comprises a first fabric belt having the first buckle, the first buckle attachment device configured to be attached to the first handle of the thirty-gallon trash can and the second buckle attachment device comprises a second fabric belt having the second buckle, the second buckle attachment device configured to be attached to the second handle of the thirty-gallon trash can.

3. The apparatus of claim 2, wherein the fabric housing is configured to hang from the first buckle attachment device and the second buckle attachment device.

4. The apparatus of claim 3, wherein the fabric housing hangs at a particular height based on an adjustable length of the first fabric belt and an adjustable length of the second fabric belt.

5. The apparatus of claim 1, wherein the first pocket is located above the second pocket on the fabric housing.

6. The apparatus of claim 1, wherein the first opening on the side of the first pocket and the first opening on the side of the second pocket together form an opening that is opened and closed with a zipper.

7. The apparatus of claim 2, wherein the first pocket is configured to receive the first roll of plastic bags having the first size through a third opening on a side of the first pocket opposite the first opening and the second pocket is configured to receive the second roll of plastic bags having the second size through a third opening on a side of the first pocket opposite the first opening.

8. The apparatus of claim 1, wherein a plastic bag from the first roll of plastic bags feeds through the second opening of the first pocket and a plastic bag from the second roll of plastic bags feeds through the second opening of the second pocket.

9. The apparatus of claim 1, wherein the fabric housing comprises machine washable fabric.

* * * * *